April 17, 1928.
A. B. CÔTE
1,666,847
BATTERY ELEMENT EXTRACTOR
Filed May 20, 1927     3 Sheets-Sheet 2
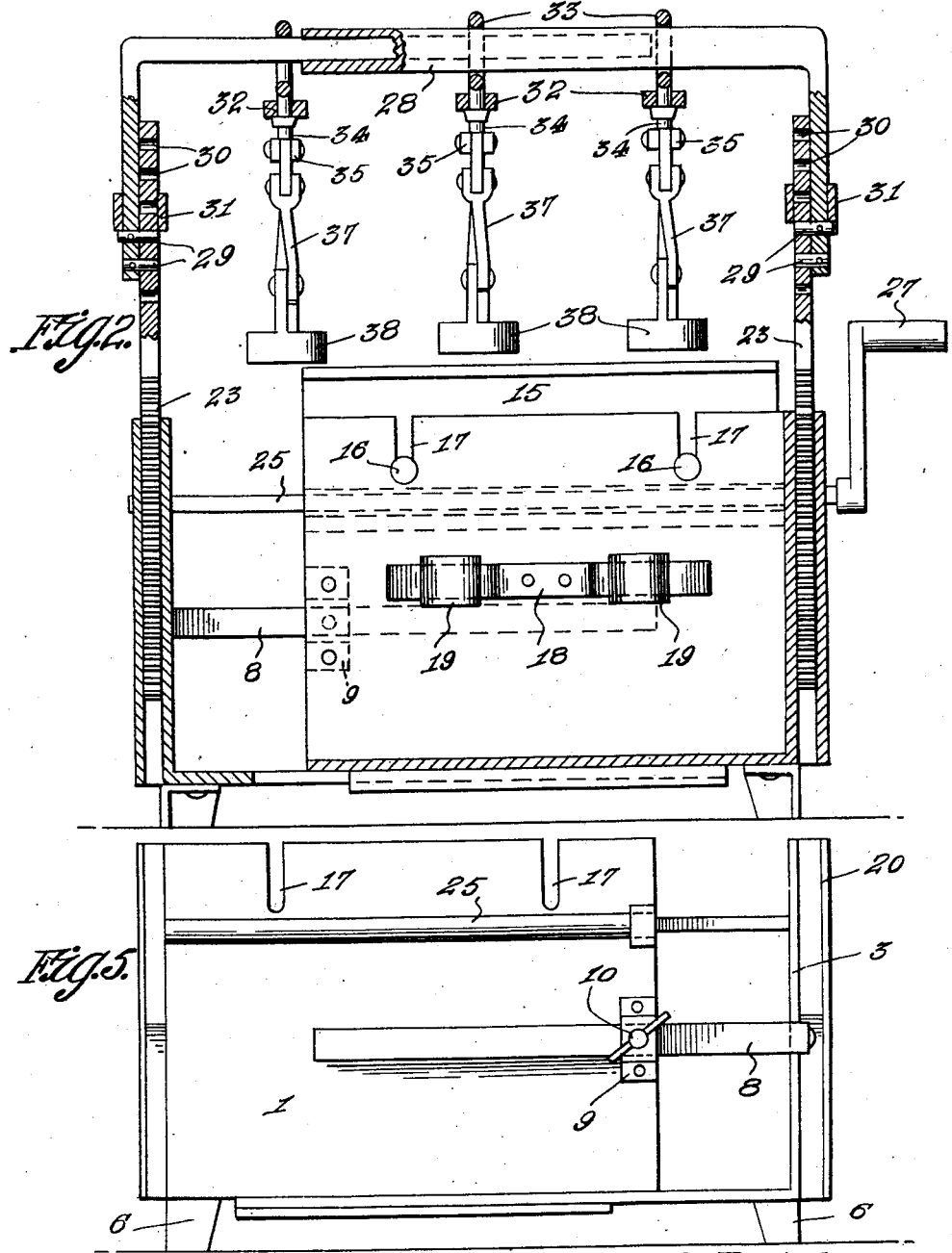
A. B. Côte,
INVENTOR
BY Victor J. Evans
ATTORNEY April 17, 1928.  
A. B. COTE  
1,666,847  
BATTERY ELEMENT EXTRACTOR  
Filed May 20, 1927  3 Sheets-Sheet 3
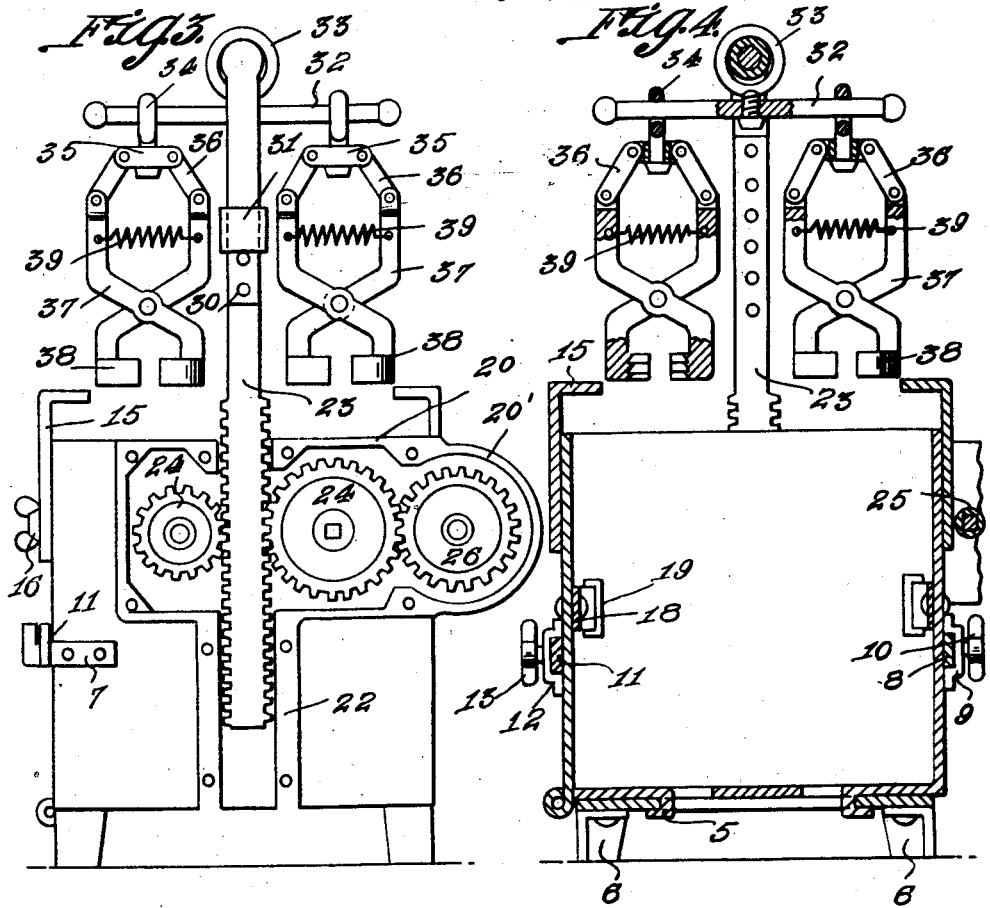
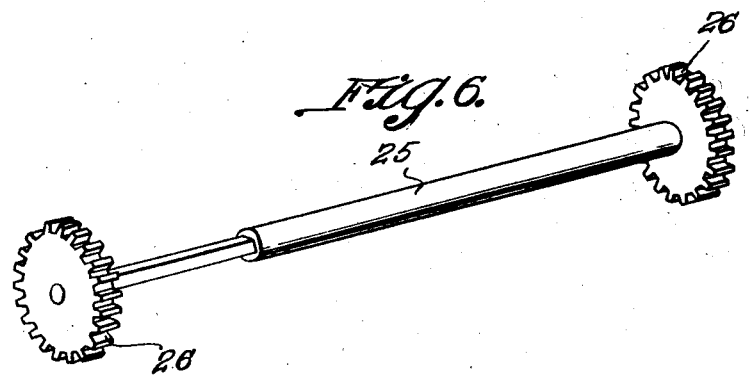
A. B. Côte, INVENTOR  
BY Victor J. Evans  
ATTORNEY Patented Apr. 17, 1928.

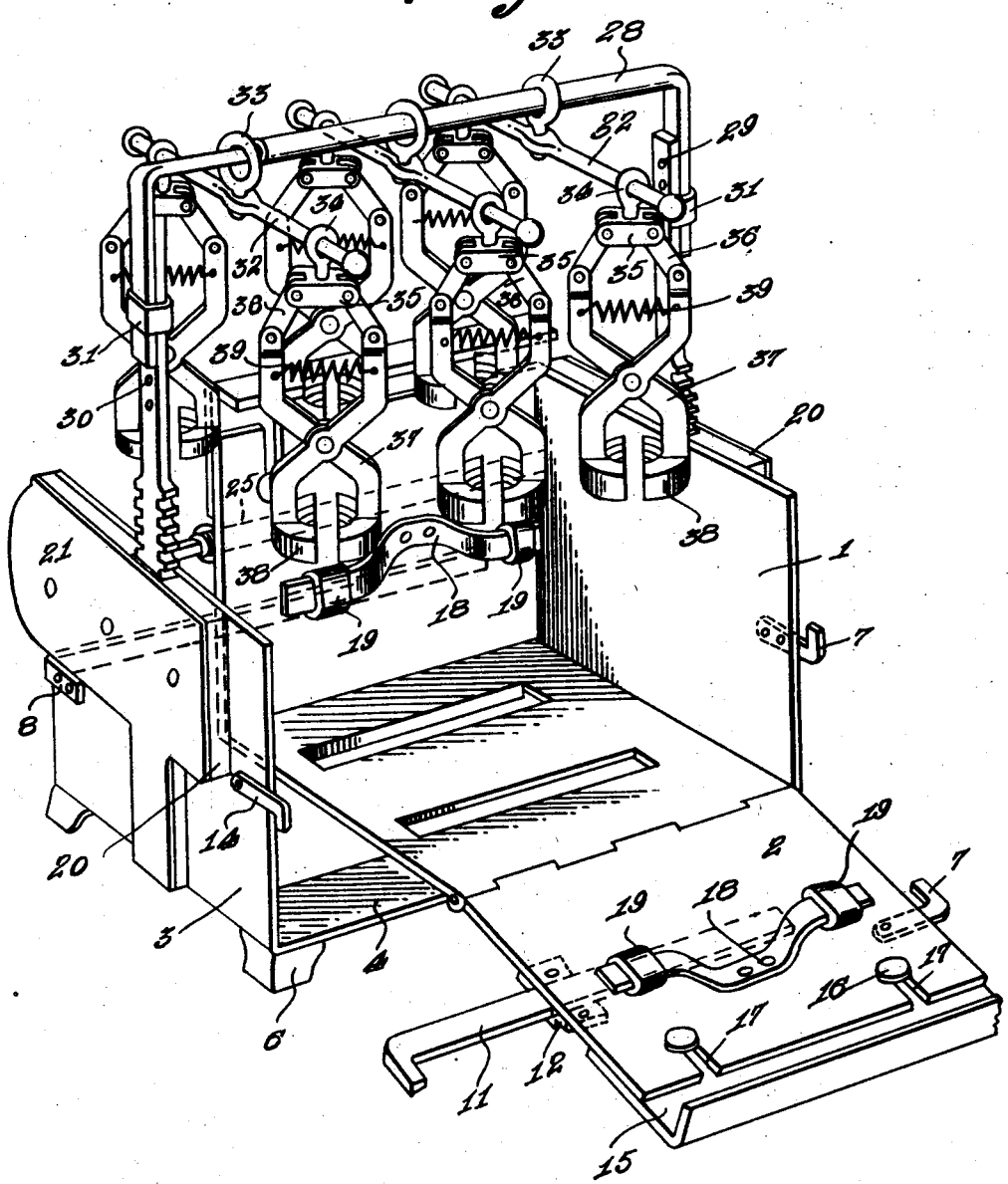

1,666,847

UNITED STATES PATENT OFFICE.

ALBERT B. CÔTE, OF PHILADELPHIA, PENNSYLVANIA.

BATTERY-ELEMENT EXTRACTOR.

Application filed May 20, 1927. Serial No. 192,998.

This invention relates to an extracting device for battery elements, the general object of the invention being to provide a casing for holding the battery, with manually operated means for lifting clamping means which is designed to grip the posts of the elements of the battery so as to pull the elements out of the battery box.

Another object of the invention is to make the parts adjustable so that they will fit different sizes of batteries.

A still further object of the invention is to so form the casing that a battery can be easily placed therein and removed therefrom.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a perspective view of the device, with the front lowered.

Figure 2 is a vertical sectional view.

Figure 3 is an end view with the cover plate of the gear casing removed.

Figure 4 is a transverse sectional view with the casing closed.

Figure 5 is a side view of the casing, showing the same expanded.

Figure 6 is a view of the telescopic shaft with a gear at each end thereof.

In these views, 1 indicates a casing which is provided with a side 2 hinged at its bottom and a movable end 3 which has a bottom piece 4 slidably arranged on the bottom of the casing through means of the guides 5, feet 6 being connected with the bottom of the casing and with the bottom piece 4. The side 2 is held in closed position by the latch members 7 and a bar 8 has one end fastened to the movable end 3 and this bar passes through the guides 9 on the immovable side of the casing, the bar being held in adjusted position by means of the thumb screws 10 passing through threaded holes in the guides 9. A latch bar 11 is slidably arranged in a guide 12 on the side 2 and is held in adjusted position by the turn screw 13 passing through said guide and the hooked end of this bar is adapted to engage a latch member 14 on the movable end 3 so that the end can be held in adjusted position by means of the bars 8 and 11.

A flanged piece 15 is adjustably connected with each side of the casing through means of the bolt and thumb nuts 16 engaging slots 17 in each side and passing through holes in the flanged piece, the flanges of these pieces being adapted to engage the top edges of a battery box to hold the same in the casing. By making the end 3 adjustable, the casing can be adjusted to fit different sizes of battery boxes and in order to make the casing hold boxes of narrower width, I place springs 18 on the inner walls of the sides of the casing which have tabs 19 thereon to engage the sides of the box.

A housing 20 is formed on each end of the casing, each housing being provided with a removable cover plate 21 and each housing forms guideways 22 for a vertically arranged rack bar 23. A pair of gears 24 is journaled in each housing, the gears meshing with the teeth of the rack bar and a telescopic shaft 25 has its ends journaled in extensions 20' of the housings and has gears 26 fastened to its ends, each gear 26 meshing with one of the gears 24 in each housing. A crank handle 27 is connected with one end of the telescopic shaft so that by turning this handle, the shaft will be rotated, and its movement will be communicated to the gears 24 to move the rack bars vertically.

A yoke 28, formed of two telescopic sections, has its limbs adjustably connected with the upper ends of the rack bars through means of the pins 29 engaging the holes 30 and the collars 31.

Bars 32 are each swiveled on an eye member 33 which are mounted on the yoke 28, so that they can be moved on said yoke and each bar has a pair of eye members 34 thereon, each eye member having a block 35 pivoted thereto and each block is connected by a pair of links 36 with the upper end of a gripping member 37, each gripping member being composed of two parts pivotally connected together and having semi-circular toothed jaws 38 at their lower ends. A spring 39 tends to hold the jaws in closed position.

A battery box, the elements of which are to be removed, is placed in the casing, after the same has been adjusted to fit the box and then the end 2 is closed, it being understood that the flanges of the members 15 must engage the upper edges of the box. Then the jaws 38 are placed over the posts of the elements and then the crank handle is turned to move the rack bars and the yoke upwardly. As the gripping members are carried upwardly with the yoke, the jaws 38 will be caused to grip the post more firmly, and as the yoke continues to move upwardly, the gripping members will pull the elements from the box. It will, of course, be understood that the various parts must be adjusted to place the gripping means directly over the post, but this can be done by sliding the gripping means on the bars 32 and adjusting the bars on the yoke. By making the parts adjustable, the device can be used with various sizes and types of battery boxes, and it will also be understood that the device can be used for removing a single element or any number of elements of a battery.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a casing, means for holding a battery box therein, a member movably supported by the casing and extending above the same, gripping means carried by said member for gripping the posts of the battery elements and means for raising the member to cause said gripping means to pull the elements from the box.

2. A device of the class described comprising a casing, means for holding a battery box therein, a yoke member movably supported at the ends of the casing, manually operated means for raising the yoke member, rods movably supported by the yoke member and gripping members movably supported on the rods and adapted to engage posts of the battery elements to pull said elements from the box.

3. A device of the class described comprising a casing, flanged members adjustably connected therewith, the flanges of said members engaging the edges of a battery post to hold the same in the casing, a yoke member movably arranged at the ends of the casing, manually operated means for raising the yoke member and gripping members carried by the yoke member for engaging posts of the battery elements to pull the same from the box when the yoke member is raised.

4. A device of the class described comprising a casing having a side hinged to its bottom and one end adjustable toward and away from the other end, means for holding the end in adjusted position, flanges adjustably connected with the sides for engaging the edges of a battery box to hold the same in the casing, a yoke member movably connected with portions of the casing and gripping members carried by the yoke member for gripping the posts of the battery elements.

5. A device of the class described comprising a casing, means for holding a battery box therein, a yoke member, rack bars adjustably connected with the limbs of the yoke member, gears journaled on some of the side walls of the casing and meshing with the teeth of the rack bars, a shaft journaled at one side of the casing, gears thereon meshing with the other gears, a handle connected with the shaft and gripping means carried by the yoke member.

6. A device of the class described comprising a casing, means for adjusting the length of the same, one side of the casing being hingedly connected with the bottom thereof, a telescopic shaft journaled at one side of the casing, gears on the ends of the shaft, a handle connected with one end of the shaft, a telescopic yoke member, rack bars adjustably connected with the limbs of the yoke member, guiding means at the ends of the casing for the rack bars, gears journaled to the ends of the casing for engaging the teeth of the rack bars, some of said gears meshing with the gears on the shaft, bars slidably mounted on the yoke member and gripping members slidably arranged on the bars for engaging the posts of a battery.

In testimony whereof I affix my signature.

ALBERT B. CÔTE.